United States Patent
Liu et al.

(10) Patent No.: US 9,680,820 B2
(45) Date of Patent: Jun. 13, 2017

(54) DECRYPTING AND DECODING MEDIA ASSETS THROUGH A SECURE DATA PATH

(71) Applicant: Telefonaktiebolaget L M Ericsson (publ), Stockholm (SE)

(72) Inventors: Weiwan Liu, Santa Clara, CA (US); Michael Maietta, San Jose, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 64 days.

(21) Appl. No.: 14/876,315

(22) Filed: Oct. 6, 2015

(65) Prior Publication Data
US 2017/0006025 A1    Jan. 5, 2017

Related U.S. Application Data

(60) Provisional application No. 62/187,765, filed on Jul. 1, 2015.

(51) Int. Cl.
*H04L 29/00* (2006.01)
*H04L 29/06* (2006.01)
*G06F 21/10* (2013.01)

(52) U.S. Cl.
CPC .......... *H04L 63/0823* (2013.01); *G06F 21/10* (2013.01); *H04L 63/061* (2013.01); *H04L 63/0876* (2013.01)

(58) Field of Classification Search
CPC .............. G06F 21/10; G06F 17/30017; G06F 2221/2103; G06F 17/30053; G06F 17/3012
See application file for complete search history.

(56) References Cited

U.S. PATENT DOCUMENTS

2002/0012432 A1  1/2002 England et al.
2013/0152180 A1  6/2013 Nair et al.

FOREIGN PATENT DOCUMENTS

EP    1978462 A1    10/2008

OTHER PUBLICATIONS

Microsoft PlayReady Content Access Technology, White Paper, Microsoft Corporation, Jul. 2008, 13 pages.
Microsoft PlayReady Device Porting Kit v2.0, Microsoft Corporation, Aug. 30, 2011, 18 pages.
MovieLabs Specification for Enhanced Content Protection, Version 1.1, Motion Picture Laboratories, Inc., Feb. 2015, 7 pages.

*Primary Examiner* — Ghazal Shehni
(74) *Attorney, Agent, or Firm* — Nicholson de vos Webster & Elliott LLP

(57) ABSTRACT

A client device for decrypting and decoding media assets through a secure data path. The client device includes a host core and global memory in a common execution environment and a secure core and restricted memory in a secure execution environment. The secure core generates a license challenge only in the context of the secure execution environment and processes a license challenge response that includes a media content decryption key only in the context of the secure execution environment. The secure core decrypts a protected media asset using the media content decryption key only in the context of the secure execution environment such that the decryption key and decrypted media asset will not be in global memory thereby protecting the media asset from unauthorized access.

21 Claims, 4 Drawing Sheets

DECRYPTING AND DECODING MEDIA ASSETS THROUGH A SECURE DATA PATH

CROSS-REFERENCE TO RELATED APPLICATIONS

This application claims the benefit of U.S. Provisional Application No. 62/187,765, filed Jul. 1, 2015, which is hereby incorporated by reference.

FIELD

Embodiments of the invention relate to the field of media systems, and more specifically, to decrypting and decoding media assets through a secure data path.

BACKGROUND

Media protection technology exists to protect the intellectual property of media. Media protection technology typically includes encryption protection under the term Digital Rights Management (DRM). There are different techniques for implementing DRM. Some techniques include a client device receiving an encrypted media asset and requesting a key from a central server (sometimes referred to as a license server) that can be used to decrypt the encrypted media asset. For example, when requesting to play a protected video, the client device may generate and transmit a challenge to a license server that in turn determines whether the client device is licensed to play that protected video. If the client device is licensed to play that protected video, the license server generates and transmits a response to the client device that includes the key to decrypt the protected video. The client device then decrypts the protected video using the key.

Some DRM techniques also use a secure data path (sometimes called a secure media path or pipeline) that aims to provide an end-to-end protection that includes decryption through a protected output.

Some DRM techniques are implemented in software such that the host CPU (sometimes referred to as a host core) stores the decryption key in global memory and decrypts the media asset in global memory. Since global memory can be accessed by other processes or by other ways (e.g., through use of a sniffer on the memory bus), hackers may access the contents of global memory and may determine the decryption key and/or the decrypted content itself.

SUMMARY

In an embodiment, a client device includes a host core and global memory in a common execution environment and a secure core and restricted memory in a secure execution environment. The secure core generates a license challenge only in the context of the secure execution environment and processes a license challenge response that includes a media content decryption key only in the context of the secure execution environment. The secure core decrypts a protected media asset using the media content decryption key only in the context of the secure execution environment such that the decryption key and decrypted media asset will not be in global memory thereby protecting the media asset from unauthorized access.

In an embodiment, a client device decrypts and decodes media assets through a secure data path including encrypting, by a secure core in a secure execution environment of the client device, a device certificate template and a private key using a key that is unique to the client device. The encrypted device certificate template and the private key are stored in global memory in a common execution environment. The host core receives a request to play a protected media asset and receives the protected media asset and metadata for the protected media asset that includes a media asset key identifier of the protected media asset. The host core reads and passes to the secure core the encrypted device certificate template and the private key. The secure core decrypts the encrypted device certificate template and the private key using the key that is unique to the client device. The secure core generates, using the device certificate template, a unique device certificate that is unique to the client device that includes a public key that corresponds to the private key. The unique device certificate is stored in the restricted memory. The secure core generates a license challenge that includes the unique device certificate and the media asset key identifier. The secure core passes the generated license challenge to the host core and the host core transmits the generated license challenge to a license server. The host core receives a response from the license server that includes an encrypted content key for decrypting the protected media asset, wherein at least the encrypted content key is encrypted with the public key of the unique device certificate, and passes the encrypted content key to the secure core. The secure core decrypts, using the private key, the encrypted content key to reveal a decrypted content key for decrypting the protected media asset. The secure core stores the decrypted content key in the restricted memory. The secure core receives the protected media asset from the host core and decrypts the protected media asset using the decrypted content key. A decoder in the secure execution environment decodes the decrypted media asset.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
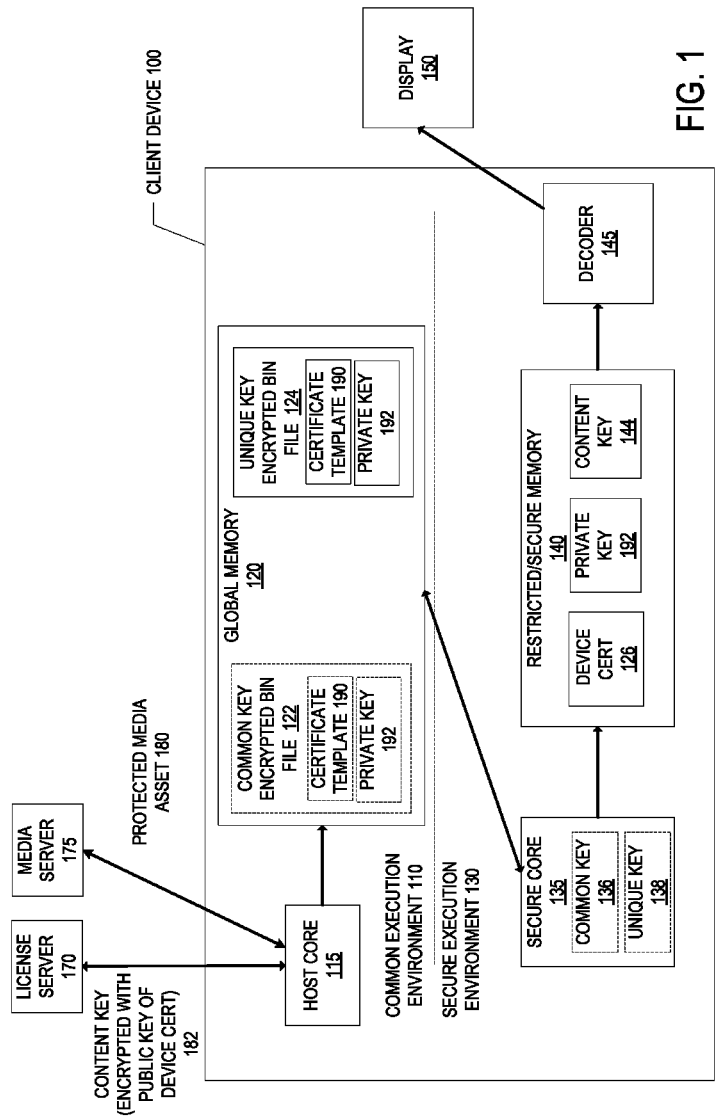
FIG. 1 illustrates an exemplary client device that decrypts and decodes media assets through a secure data path according to an embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for decrypting and decoding media assets through a secure data path is described. In one embodiment a client device that includes a common execution environment and a secure execution environment stores cryptographic information critical for decrypting and decoding the media assets only in the secure execution environment. The client device generates a license challenge only in the context of the secure execution environment and processes the license challenge response from a license server only in the context of the secure execution environment. The client device decrypts protected media assets only in the context of the secure execution environment. Since the decryption of protected media assets occurs only in the context of the secure execution environment, the decryption key and decrypted media asset will not be in global memory thus protecting the media asset from unauthorized access.

FIG. 1 illustrates an exemplary client device that decrypts and decodes media assets through a secure data path according to an embodiment. The client device 100 includes a common execution environment 110 that includes a host core 115 and global memory 120 that can be accessed by any hardware and software of the client device; and a secure execution environment 130 that includes a secure core 135 and a restricted/secure memory 140. The client device 100 receives media from the media server 175 where at least some of the media assets are encrypted. The client device 100 is also coupled with the license server 170 for requesting and receiving decryption keys for decrypting encrypted media assets. The client device 100 can be any type of computing device that is capable of decrypting and decoding media assets and implements a common execution environment and secure execution environment. For example, the client device 100 can be a workstation, laptop, netbook, tablet, mobile phone, smartphone, portable media player, gaming system, wearable device, set-top box, etc.

The secure execution environment 130 may be in some embodiments a trusted execution environment. The secure execution environment 130 offers a higher level of security than the common execution environment 110. The resources of the common execution environment 110 can be accessed by the resources of the secure execution environment 130; however the resources of the secure execution environment 130 can only be accessed by other resources of the secure execution environment 130.

The global memory 120 includes a common key encrypted binary file 122 that includes the certificate template 190 and private key 192 that is encrypted with a common key 136 that is common to multiple devices. This encryption of the certificate template 190 and private key 192 may be done offline and transmitted to the client device 100 (e.g., as part of a software package for securing media content). The global memory 120 also includes a unique key encrypted binary file 124 that includes the certificate template 190 and private key 192 that is encrypted by the secure core 135 using the unique key 138, which will be described in greater detail later herein. The global memory 120 may include one or more of volatile and non-volatile memories, such as Random Access Memory ("RAM"), Read Only Memory ("ROM"), a solid state disk ("SSD"), Flash, Phase Change Memory ("PCM"), or other types of data storage.

The secure core 135 is a processing unit that is separate from the host core 115 and is capable of performing cryptographic operations (encryption and decryption) among other operations. The secure core 135 may be constructed using tamper resistant technologies. The secure core 135 may be on the same integrated circuit die as the host core 115 or may be on a different integrated circuit die as the host core 115. By way of example, the secure core 135 may be implemented on a system-on-a-chip (SoC). The secure core 135 may be assigned or generate a unique key 138 that is used when generating a private key for cryptographic operations described later herein. The unique key 138 may be embedded into the secure core 135 during manufacturing in some embodiments (e.g., in a one-time-programmable read-only memory). In some embodiments, the unique key 138 is generated by the secure core 135 using a random number generator that uses a unique value embedded into the secure core 135 during manufacturing as a seed value. As will be described in greater detail later herein, the secure core 135 generates a license challenge, processes the license server response, retrieves the keys to decrypt encrypted media assets, and decrypts the encrypted media assets in the restricted/secure memory 140.

The restricted/secure memory 140 is coupled with the secure core 135 and the decoder 145. In some embodiments, the restricted/secure memory 140 is only readable by the secure core 135 and the decoder 145. That is, the restricted/secure memory 140 is not readable by the host core 115. The restricted/secure memory 140 stores, among other things, a device certificate 126 and a private key 192, which will be described in greater detail later herein. In an embodiment, the secure core 135 may scramble or otherwise obfuscate the data and/or addresses of the restricted/secure memory 140. For instance, the addresses may be scrambled such that the physical memory location of the data is stored in the restricted/secure memory 140 in an unpredictable manner. The restricted/secure memory 140 may include one or more of volatile and non-volatile memories, such as RAM, ROM, SSD, Flash, PCM, or other types of data storage.

The decoder 145 is a media decoder that is capable of decoding media assets and outputting the decoded media assets in a format suitable for displaying on the display 150. The decoder 145 is part of the secure execution environment 130. The decoder 145 may output the coded media asset to the display 150 through a protected output, such as using High-bandwidth Digital Content Protection (HDCP).

Figure 2:
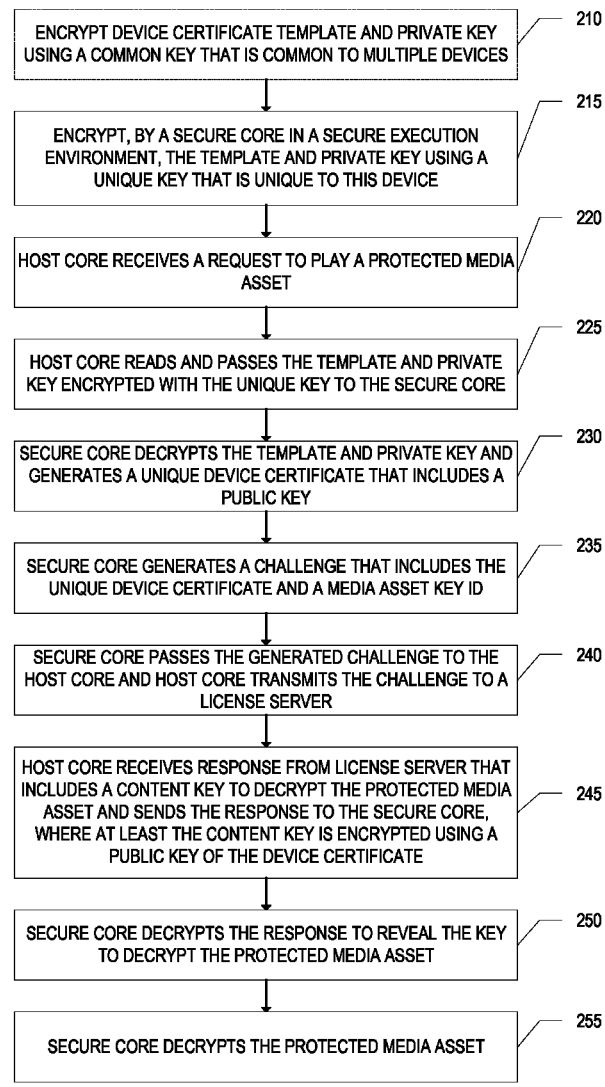
FIG. 2 is a flow diagram illustrating exemplary operations for decrypting and decoding media assets through a secure data path according to one embodiment.

FIG. 2 is a flow diagram illustrating exemplary operations for decrypting and decoding media assets through a secure data path according to one embodiment. The operations of FIG. 2 will be described with respect to the exemplary embodiment of FIG. 1. However, it should be understood that the exemplary embodiment of FIG. 1 can perform operations different than those discussed with respect to FIG. 2, and the operations described with respect to FIG. 2 can be performed by embodiments different than those of FIG. 1.

At operation 210, a device certificate template 190 and a private key 192 are encrypted using a common key 136 that is common to multiple client devices. In an embodiment, the common key 136 is a symmetric key produced by a symmetric-key algorithm such as AES, Blowfish, RC4, 3DES, etc. In one embodiment the common key 136 may be generated by the secure core 135 using a value embedded into the secure core 135 during manufacturing. In one embodiment, this operation is performed offline (not by the client device 100) and the result (the common key encrypted binary file 122 that includes the device certificate template 190 and private key 192) are communicated to the client device 100, where the client device 100 has access to the common key 136 necessary to decrypt the encrypted device certificate template and private key. As detailed below, the secure core 135 includes a device certificate 126 generated using the device certificate template and includes this as part of a challenge sent to the license server 170 when requesting a license to a protected media asset.

Next, at operation 215, the secure core 135 decrypts the common key encrypted binary file 122 (using the common key 136) to reveal the device certificate template 190 and private key 192 and then encrypts the device certificate template 190 and private key 192 using a unique key 138 that is unique to the secure core 135. The unique key 138 may be a random number that is generated by the secure core 135 using a unique value embedded into the secure core 135 during manufacturing as a seed value. The unique key 138 may be a symmetric key produced by a symmetric-key algorithm such as AES, Blowfish, RC4, 3DES, etc. The unique key encrypted binary file 124 that includes the device certificate template 190 and private key 192 may be stored in global memory 120. In one embodiment, the host core 115 utilizes an application programming interface (API) to cause the secure core 135 to encrypt the device certificate template and private key. In an embodiment, after encrypting the device certificate template and private key using the unique key 138, the common key encrypted binary file 122 that includes the certificate template 190 and private key 192 is deleted from the global memory 120.

Next, at operation 220, the host core 115 receives a request to play a protected media asset. For example, a user may request to watch a video-on-demand (VOD) asset that is encrypted. The host core 115 submits a request for the media asset from the media server 175 and receives a protected media asset 180 from the media server 175 (which may be streamed). Metadata may also be received (e.g., in a header) in addition to the media content itself that may include an identifier that is sometimes referred to as a media content key ID ("key ID") that is a globally unique identifier that identifies the media content and a URL of the license server 170. Flow then moves to operation 225.

At operation 225, the host core 115 reads and passes the device certificate template and private key encrypted with the unique key to the secure core 135. The host core 115 may also pass the metadata information that includes the key ID to the secure core 135. As detailed above, the device certificate template and private key have been encrypted using a unique key available only to the secure execution environment 130. Thus, a process executing on the host core 115 cannot decrypt the unique key encrypted binary file 124 that includes the certificate template 190 and private key 192. Next, at operation 230, the secure core 135 decrypts the encrypted device certificate template and private key thereby revealing the device certificate template and private key and generates a unique device certificate 126 that includes a public key that corresponds to the private key 192. The unique device certificate 126 and the private key 192 are stored in the restricted/secure memory 140. Flow then moves to operation 235.

At operation 235, the secure core 135 generates a challenge that includes the unique device certificate 126 and also includes the key ID of the media asset. The information in the challenge is used by the license server 170 to determine whether the client device 100 is authorized to play the media asset. Thus it should be understood that the license challenge is generated in the secure execution environment 130.

Next, at operation 240, the secure core 135 passes the generated challenge to the host core 115 and the host core 115 transmits the challenge to the license server 170. The license server 170 may be identified through the URL that is included in the metadata of the media asset. The license server 170 analyzes the data in the challenge and determines whether the client device 100 is authorized to play the media asset. Assuming that the client device 100 is authorized to play the media asset, the license server 170 obtains the key ID for the media asset and either generates a license using the key ID and a key seed on the license server 170 or generates a license with a content key that is associated with the key ID. In either case, if authorized for playback, the license server 170 generates a response that includes the license. The license server 170 encrypts at least the content key (the key necessary to decrypt the media asset) with the public key included in the unique device certificate 126. Since the private key 192 that corresponds with the public key included in the unique device certificate 126 is stored in the restricted/secure memory 140, the host core 115 does not have access to the private key 192 and therefore cannot decrypt the encrypted content key 182. The license server 170 transmits at least the encrypted content key 182 to the host core 115.

At operation 245, the host core 115 receives the response from the license server 170 that includes the encrypted content key 182 and sends at least the encrypted content key 182 to the secure core 135, where at least the content key is encrypted using a public key of the unique device certificate 126. At operation 250, the secure core 135 decrypts the response (at least the part that is encrypted) using the private key 192 thereby revealing the key to decrypt the protected media asset (the content key 144). The content key 144 is stored in the restricted/secure memory 140 and can be used by the secure core 135 to decrypt the protected media asset. Next, at operation 255, the secure core 135 uses the content key 144 to decrypt the protected media asset. The decrypted media asset is then decoded by the decoder 145 and output to the display 150 for playback.

Figure 3A:
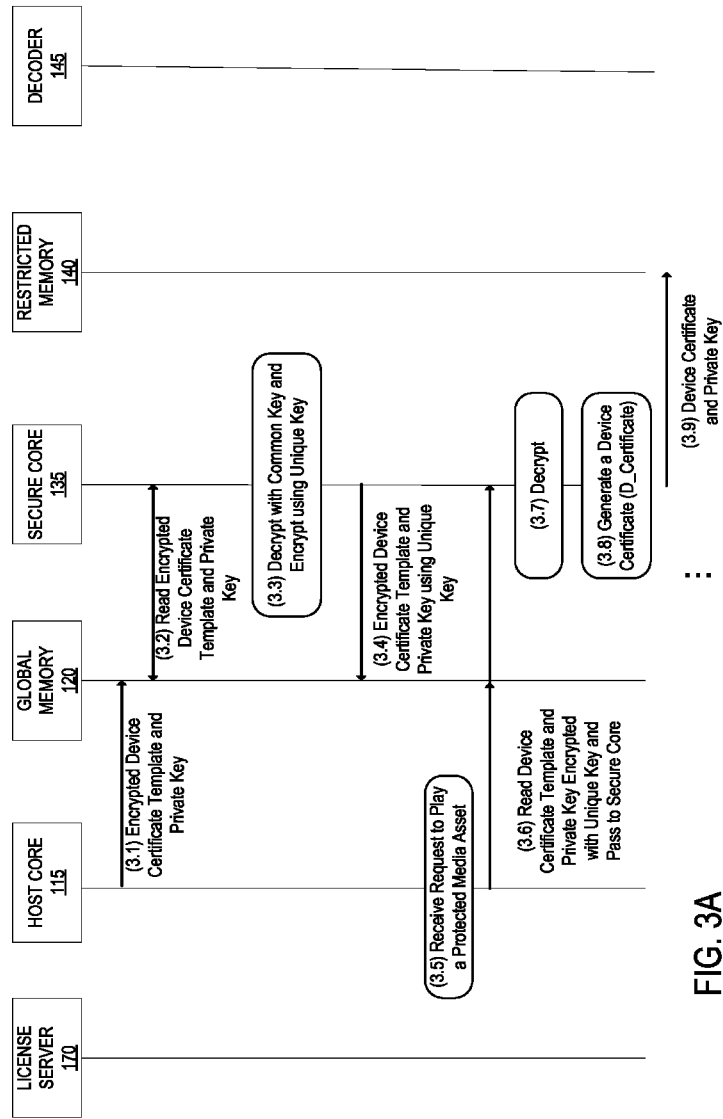
FIG. 3A is a first part of a sequence diagram illustrating exemplary operations for decrypting and decoding media assets through a secure data path according to one embodiment.
Figure 3B:
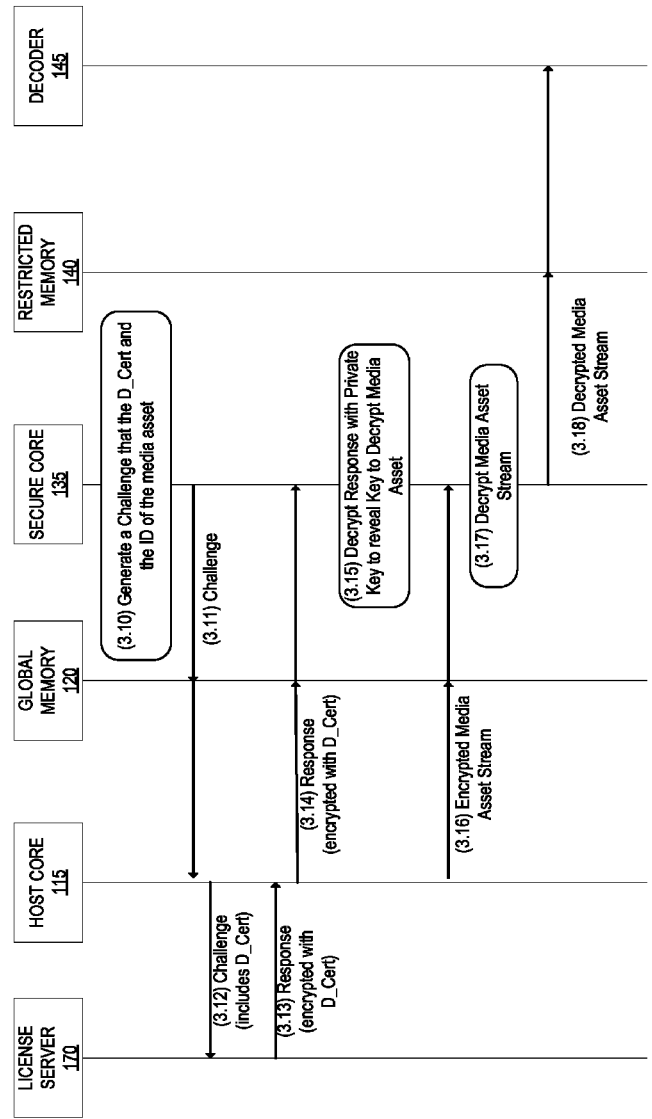
FIG. 3B is a second part of a sequence diagram illustrating exemplary operations for decrypting and decoding media assets through a secure data path according to one embodiment.

FIGS. 3A-3B are sequence diagrams illustrating exemplary operations for decrypting and decoding media assets through a secure data path according to some embodiments. Prior to the operations of these figures, a device certificate template and private key were encrypted using a common key 136 that is commonly known across multiple devices. At operation 3.1, the host core 115 stores the common key encrypted binary file 122 that includes the device certificate template 190 and private key 192 in the global memory 120. The secure core 135 then reads the common key encrypted binary file 122 that includes the device certificate template 190 and private key 192 from the global memory 120 at operation 3.2. The secure core 135 decrypts the common key encrypted binary file 122 to reveal the device certificate template 190 and private key 192 and then re-encrypts the device certificate template 190 and private key 192 using the unique key 138 at operation 3.3. The secure core 125 stores the unique key encrypted binary file 124 that includes the device certificate template 190 and the private key 192 in the global memory 120 at operation 3.4. In an embodiment, the secure core 135 or the host core 115 deletes the common key encrypted binary file 122 that includes the device certificate template 190 and private key 192 from the global memory 120 after the device certificate template 190 and the private key 192 have been encrypted with the unique key 138.

At operation 3.5, the host core 115 receives a request to play a protected media asset. Although not illustrated in FIGS. 3A-3B, after receiving the request, the host core 115 requests and receives the requested protected media asset 180 from the media server 175. The host core 115 also receives metadata that includes an identifier that identifies the media content and a URL of the license server 170. At operation 3.6, the host core 115 reads the unique key encrypted binary file 124 that includes the device certificate template 190 and private key 192 encrypted with the unique key 138 and passes it to the secure core 135.

At operation 3.7, the secure core 135 decrypts the unique key encrypted binary file 124 to reveal the device certificate template 190 and private key 192. Next, at operation 3.8, the secure core 135 generates a unique device certificate 126 that corresponds with the private key 192 and stores the result in the restricted memory 140. The unique device certificate 126 is unique to the client device 100. The device certificate 126 includes a public key that corresponds to the private key.

The secure core 135 generates a challenge that includes the device certificate 126 and the ID of the media asset at operation 3.10. This challenge is passed through the global memory 120 to the host core 115 at operation 3.11. The host core 115 causes the challenge to be transmitted to the license server 170 at operation 312. The license server 170 determines that the client device 100 is authorized to playback the protected media content and generates a response that includes a content key necessary to decrypt the protected media content encrypted with the public key included in the unique device certificate 126 sent to the license server 170 in the challenge. The response is transmitted to the host core 115 at operation 3.13. The host core 115 passes the response through the global memory 120 to the secure core 135 at operation 3.14. The secure core 135 decrypts the response with the private key 192 to reveal the key to decrypt the protected media asset at operation 315. The host core 115 passes the encrypted media asset through the global memory 120 to the secure core 135 at operation 3.16. Using the decrypted content key, the secure core 135 decrypts the media asset at operation 3.17 and passes the decrypted media asset through the restricted memory 140 to the decoder 145 at operation 3.18 for further processing.

It will be appreciated that additional components, not shown, may also be part of the client device 100, and, in certain embodiments, fewer components than that shown may also be used. For example, in some embodiments where the client device 100 is a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files.

In some embodiments, PlayReady by Microsoft, Inc. is used as the digital rights management (DRM) protocol described herein. For instance, the client device 100 may be a PlayReady client, the license server 170 and the media server 175 may be PlayReady servers, the certificate template 190 may be a PlayReady device certificate, and the challenge/response protocol may be defined by the PlayReady protocol.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a client device for decrypting and decoding media assets through a secure data path, comprising:
   encrypting, by a secure core in a secure execution environment of the client device, a device certificate template and a private key using a key that is unique to the client device;
   storing the encrypted device certificate template and the private key in global memory in a common execution environment;
   receiving, by a host core in the common execution environment, a request to play a protected media asset;
   receiving, by the host core, the protected media asset and metadata for the protected media asset that includes a media asset key identifier of the protected media asset;
   reading, by the host core, the encrypted device certificate template and the private key and passing the encrypted device certificate template and the private key to the secure core;
   decrypting, by the secure core, the encrypted device certificate template and the private key using the key that is unique to the client device;
   generating, by the secure core using the device certificate template, a unique device certificate that is unique to the client device that includes a public key that corresponds to the private key;
   storing, by the secure core, the unique device certificate in a restricted memory of the secure execution environment;
   generating, by the secure core, a license challenge that includes the unique device certificate and the media asset key identifier;
   passing the generated license challenge from the secure core to the host core;
   transmitting, by the host core the generated license challenge to a license server;
   receiving, by the host core a response from the license server that includes an encrypted content key for decrypting the protected media asset, wherein at least the encrypted content key is encrypted with the public key of the unique device certificate;

passing the encrypted content key to the secure core;

decrypting, by the secure core using the private key, the encrypted content key to reveal a decrypted content key for decrypting the protected media asset;

storing, by the secure core the decrypted content key in the restricted memory;

passing the protected media asset from the host core to the secure core;

decrypting, by the secure core, the protected media asset using the decrypted content key; and decoding, by a decoder in the secure execution environment, the decrypted media asset.

2. The method of claim 1, wherein prior to encrypting the device certificate template and the private key using the key that is unique to the client device, the device certificate template and the private key are encrypted using a common key that is common to multiple client devices, and the following operation is performed:

decrypting, by the secure core, the device certificate template and the private key using the common key.

3. The method of claim 2, wherein after encrypting the device certificate template and the private key using the key that is unique to the client device, removing the encrypted device certificate template and the private key that are encrypted using the common key.

4. The method of claim 1, wherein the key that is unique to the client device is a symmetric key.

5. The method of claim 1, wherein the secure execution environment is a trusted execution environment.

6. The method of claim 1, wherein the host core does not have access to the restricted memory.

7. The method of claim 1, further comprising:

obfuscating data stored in the restricted memory.

8. A client device for decrypting and decoding media assets through a secure data path, comprising:

a host core coupled to a global memory;

a secure core coupled to the global memory, a restricted memory, and a decoder, wherein the secure core is configured to:

encrypt a device certificate template and a private key using a key that is unique to the client device, store the encrypted device certificate template and the private key in the global memory, receive a request from the host core to decrypt and decode a protected media asset that is associated with a media asset key identifier, retrieve the encrypted device certificate template and the private key to the secure core, decrypt the encrypted device certificate template and the private key using the key that is unique to the client device, generate, using the device certificate template, a unique device certificate that is unique to the client device that includes a public key that corresponds to the private key, store the unique device certificate in the restricted memory, generate a license challenge that includes the unique device certificate and the media asset key identifier, pass the generated license challenge from the secure core to the host core for transmission to a license server, receive from the host core a response from the license server that includes an encrypted content key for decrypting the protected media asset, wherein at least the encrypted content key is encrypted with the public key of the unique device certificate;

decrypt, using the private key, the encrypted content key to reveal a decrypted content key for decrypting the protected media asset, store the decrypted content key in the restricted memory, receive the protected media asset, decrypt the protected media asset using the decrypted content key; and pass the decrypted media asset to the decoder for decoding.

9. The client device of claim 8, wherein prior to encryption of the device certificate template and the private key using the key that is unique to the client device, the secure core is configured to decrypt the device certificate template and the private key using a common key that is common to multiple client devices.

10. The client device of claim 9, wherein the secure core is further configured to remove the encrypted device certificate template and the private key that are encrypted using the common key after encryption of the device certificate template and the private key using the key that is unique to the client device.

11. The client device of claim 8, wherein the key that is unique to the client device is a symmetric key.

12. The client device of claim 8, wherein the secure execution environment is a trusted execution environment.

13. The client device of claim 8, wherein the host core does not have access to the restricted memory.

14. The client device of claim 8, wherein the secure core is further configured to obfuscate data stored in the restricted memory.

15. A set of one or more non-transitory machine-readable storage mediums having computer code stored therein, which when executed by a set of one or more processors of a client device, causes the client device to perform operations comprising:

encrypting, by a secure core in a secure execution environment of the client device, a device certificate template and a private key using a key that is unique to the client device;

storing the encrypted device certificate template and the private key in global memory in a common execution environment;

receiving, by a host core in the common execution environment, a request to play a protected media asset;

receiving, by the host core, the protected media asset and metadata for the protected media asset that includes a media asset key identifier of the protected media asset;

reading, by the host core, the encrypted device certificate template and the private key and passing the encrypted device certificate template and the private key to the secure core;

decrypting, by the secure core, the encrypted device certificate template and the private key using the key that is unique to the client device;

generating, by the secure core using the device certificate template, a unique device certificate that is unique to the client device that includes a public key that corresponds to the private key;

storing, by the secure core, the unique device certificate in a restricted memory of the secure execution environment;

generating, by the secure core, a license challenge that includes the unique device certificate and the media asset key identifier;

passing the generated license challenge from the secure core to the host core;

transmitting, by the host core the generated license challenge to a license server;

receiving, by the host core a response from the license server that includes an encrypted content key for decrypting the protected media asset, wherein at least the encrypted content key is encrypted with the public key of the unique device certificate;

passing the encrypted content key to the secure core;

decrypting, by the secure core using the private key, the encrypted content key to reveal a decrypted content key for decrypting the protected media asset;

storing, by the secure core the decrypted content key in the restricted memory;

passing the protected media asset from the host core to the secure core;

decrypting, by the secure core, the protected media asset using the decrypted content key; and decoding, by a decoder in the secure execution environment, the decrypted media asset.

16. The non-transitory machine-readable storage medium of claim 15, wherein prior to encrypting the device certificate template and the private key using the key that is unique to the client device, the device certificate template and the private key are encrypted using a common key that is common to multiple client devices, and the following operation is performed:

decrypting, by the secure core, the device certificate template and the private key using the common key.

17. The non-transitory machine-readable storage medium of claim 16, wherein after encrypting the device certificate template and the private key using the key that is unique to the client device, removing the encrypted device certificate template and the private key that are encrypted using the common key.

18. The non-transitory machine-readable storage medium of claim 15 wherein the key that is unique to the client device is a symmetric key.

19. The non-transitory machine-readable storage medium of claim 15, wherein the secure execution environment is a trusted execution environment.

20. The non-transitory machine-readable storage medium of claim 15, wherein the host core does not have access to the restricted memory.

21. The non-transitory machine-readable storage medium of claim 15, wherein the operations further comprise:

obfuscating data stored in the restricted memory.

* * * * *